(12) United States Patent
Wetzel

(10) Patent No.: US 6,773,535 B1
(45) Date of Patent: Aug. 10, 2004

(54) ARTICLE AND METHOD FOR CONTROLLED DEBONDING OF ELEMENTS USING SHAPE MEMORY ALLOY ACTUATORS

(75) Inventor: Eric D. Wetzel, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/376,629

(22) Filed: Mar. 3, 2003

(51) Int. Cl.[7] .......................... B32B 31/26; B32B 33/00
(52) U.S. Cl. ...................... 156/247; 156/344; 156/584; 428/617
(58) Field of Search ................................ 156/160, 163, 156/272.2, 297, 344, 584, 247; 428/544, 594, 615–617; 244/119–121, 123, 125, 126–128, 131–133; 296/30; 228/141.1, 265, 903; 52/796.1; 72/379.2

(56) References Cited

U.S. PATENT DOCUMENTS 4,637,962 A * 1/1987 Albrecht et al. ............ 428/616
5,700,337 A * 12/1997 Jacobs et al. ................. 156/64
6,216,937 B1 * 4/2001 DeLaurentis et al. ......... 228/13

* cited by examiner

Primary Examiner—Richard Crispino
Assistant Examiner—Sing P. Chan
(74) Attorney, Agent, or Firm—Edward Stolarun

(57) ABSTRACT

A separable bonding system including two opposed rigid adherends and a deformed shape memory alloy element disposed between and adhesively bonded to facing surfaces of the two rigid adherends. A method of adhesively bonding and selectively debonding and separating at least two rigid adherends including mechanically straining a shape memory alloy element to form a deformed shape memory alloy element; disposing the deformed shape memory alloy element between and adhesively bonding the deformed shape memory alloy element to facing surfaces of at least two rigid adherends; elevating the temperature of the deformed shape memory alloy element sufficient to transform the deformed shape memory alloy element from the mechanically strained state to a recovered shape, thereby weakening adhesive bonds formed between the shape memory alloy element and separating the facing surfaces of the at least two rigid adherends.

20 Claims, 1 Drawing Sheet

ARTICLE AND METHOD FOR CONTROLLED DEBONDING OF ELEMENTS USING SHAPE MEMORY ALLOY ACTUATORS

BACKGROUND OF THE INVENTION

1. Field of the Invention

The present invention relates to separable adhesively bonded elements, to articles and assemblies including such separable adhesively bonded elements and to a method for separating such adhesively bonded elements from articles and assemblies. More particularly, the present invention relates to articles and assemblies having adhesively bonded shape memory alloy elements, to articles and assemblies including separable adhesively bonded elements and adhesively bonded shape memory alloy elements, and to a method of bonding and easily separating adhesively bonded elements, such as external components, employing shape memory alloy elements.

2. Brief Description of Related Art

In many industries, notably those related to the construction and/or manufacture of structures and devices in which later partial disassembly is required or anticipated, elements must be securely joined or affixed to one another for extended periods of time and still be capable of being easily separated without damaging or destroying one or more of the elements at the time of disassembly. This is of particular interest in certain aspects of the aircraft and automotive industries and in military vehicular applications, such as both wheeled and tracked ground vehicles and munitions carriers. In the construction of both fixed wing and rotary wing aircraft, such as helicopters, a particular concern is the attachment and removal of access panels and skin panels. Traditionally, such panels have been attached using mechanical fasteners. However, in modem aircraft such panels are generally constructed from advanced composite materials to reduce weight and radar cross-section. These composite materials are typically formed from fiber-reinforced polymers, such as glass or graphite fibers in an epoxy matrix. Tests have demonstrated that placing holes in composites, as is necessary when using mechanical fasteners, causes a significant loss in fatigue and static mechanical properties of the composites. Mechanical fasteners also increase the radar cross-section of the aircraft.

In order to avoid these problems, adhesives have been frequently been employed to join such elements. These adhesives are designed to achieve high strengths and thereby provide necessary load transfer between the adhered elements. However, in some cases, the bonded panels need to be removed in order to repair or replace the panels, or to gain access to underlying components. For this reason, procedures are needed for the subsequent separation and disassembly of the adhered elements.

Currently, most structures having adhesively joined elements or components are debonded mechanically. This process typically includes physical prying, chiseling, grinding, sanding, and scraping of the adhesive and/or adhered element. This approach is slow and inconsistent, requires skilled technicians, may be environmentally hazardous both to the technicians and to the aircraft itself in releasing airborne particulates, and in many cases results in significant damage to the separated components or underlying structural members or skin. Damage to the separated components is particularly undesirable during removal of access panels, since it is preferred to reuse or reattach the panel after removal. If the panel is damaged during removal, then repair or replacement of the panel incurs additional time, cost, and logistical problems.

To avoid such problems, other variations of the foregoing adhesive bonding/debonding method have been tried. Most of these have involved a selective choice of adhesive employed and a specialized treatment of the adhesive in the debonding stage of the process. Examples of those adhesives (and the concomitant processes) that have been tried or considered have included hot-melt adhesives, solvent-specific removable adhesives, thermally removable adhesives, electrically debondable adhesives, and pressure-sensitive adhesives.

Hot-melt, or meltable, thermoplastic adhesives are weakened by heating the adhesive above the melt or glass transition temperature of the adhesive. However, only a partial loss in adhesive strength is achieved, so that significant mechanical force must also be applied to separate the adhered elements (adherends). Furthermore, separation must be achieved while the adhesive is hot since bond strength resumes upon cooling.

Solvent-specific-removable adhesives can be dissolved using solvents (including, inter alia, water). These adhesives, however, by nature, offer limited solvent resistance, which restricts their environmental and service durability. Adhesives that are formulated to dissolve in only strong solvents also present environmental concerns during adhesive removal.

Thermally removable adhesives have been developed which undergo a dramatic loss in mechanical properties at a given temperature due to a thermally initiated chemical reaction within the adhesive. Unlike hot-melt adhesives, a complete loss in mechanical strength occurs at the transformation temperature. Only limited performance data is available, so the mechanical strength and environmental durability of these adhesives is not known.

Electrically debondable adhesives have been developed which debond by passing a small electrical current (~1 mA) of low voltage (~10 V) through specially formulated epoxy adhesives to weaken and ultimately debond the adhesive. Typically, electrodes are embedded at the bondline with electrical leads to permit local voltage application. The fabrication, placement, and maintenance of these electrodes often present significant cost, design, and logistical burdens. Additionally, these adhesives currently offer low to moderate structural strengths, with significant loss in mechanical properties at elevated temperatures. The long-term durability of these adhesives is also not well-characterized.

Pressure-sensitive adhesives are low strength, removable adhesives. Their mechanical properties are not sufficient for most structural applications.

An additional limitation of all of these removable adhesives is that the debonding properties are enabled through specially designed adhesive chemistries. For many critical applications, especially in the aircraft industry, any new adhesive must be fully certified before it can be implemented in the final design. This certification process, including full environmental testing, is typically very expensive and requires long test durations. These factors often make implementation of these novel adhesives impractical.

Accordingly, it is an object of the invention to provide a more expeditious, facile and predictable means for affixing and later removing components than is currently available. To this end, it is also an object of the present invention to provide an adhesive bonding system and a method employing the adhesive bonding system to adhesively and securely join or bond at least two elements or components to one another with high bond strength and subsequently, optionally, and under preselected, specified conditions, debond and separate the bonded elements or components by weakening the strength of the adhesive.

It is also an object of the present invention to provide, particularly to vehicular means including, but not limited to, ground vehicles, both wheeled and tracked; aircraft, both fixed wing and rotary; and watercraft, an adhesive bonding system employing currently existing adhesives, and a more expeditious, facile and predictable method than is currently available of adhesively bonding at least two elements to one another with high bond strength and subsequently easily separating the adhesively bonded elements, using the adhesive bonding system under predetermined conditions.

It is another object of the present invention to provide an adhesive bonding system and a method of adhesively bonding at least two elements to one another with high bond strength and subsequently separating the adhesively bonded elements with little or no damage to the separated elements such that the elements may be subsequently rebonded.

It is a further object of the present invention to provide an adhesive bonding system and a method of adhesively bonding at least two elements to one another with a high bond strength and subsequently easily separating the adhesively bonded elements with few if any modifications required to the existing design, manufacturing, or repair specifications of either the elements undergoing bonding or the equipment or materials employed in the bonding process, other than the additional inclusion of shape memory alloy elements.

It is still another object of the present invention to provide an adhesive bonding system and a method of adhesively bonding at least two elements to one another with high bond strength and subsequently separating the adhesively bonded elements, which bonding system and method are both affordable and practical to implement.

It is an object of the present invention to provide an adhesive bonding system and a method of adhesively bonding at least two elements to one another with high bond strength and subsequently separating the adhesively bonded elements requiring minimal technical skill.

It is an object of the present invention to provide an adhesive bonding system and a method of adhesively bonding at least two elements to one another with high bond strength and easily subsequently separating the adhesively bonded elements with a minimum of environmental disturbance of an audible, chemical or particulate nature.

Further objects of the present invention include providing the aforementioned objects in an aeronautical environment, particularly in applications to aircraft of both fixed and rotary wing design.

SUMMARY OF THE INVENTION

This invention is suitable for use in any situation where it is desirable to adhesively and securely join or bond at least two elements or components and subsequently, optionally, and under pre-selected, specified conditions, debond, by weakening the strength of the adhesive, and separate the elements or components. Although generally applicable to most structures where it may be optionally desirable to subsequently remove a component part, the invention is particularly applicable to vehicular means including, but not limited to, ground vehicles, both wheeled and tracked; aircraft, both fixed wing and rotary; and watercraft.

The present invention further provides an adhesive bonding system and a method of adhesively bonding at least two elements to one another by forming an adhesive bond therebetween with a high bond strength, comparable or equivalent to bond strengths obtained with a conventional adhesive used in a conventional direct element-to-element adhesive bond configuration for the same type of bond, and subsequently weakening the adhesive bond formed between the adhesively bonded elements under predetermined controlled conditions such that the adhesively bonded elements may be debonded and easily separated.

The present invention additionally provides an adhesive bonding system and a method of adhesively bonding at least two elements to one another by forming an adhesive bond therebetween with a high bond strength and subsequently separating the adhesively bonded elements under predetermined controlled conditions with little or no damage to the separated elements such that one or more of the elements may be subsequently rebonded.

The present invention further provides an adhesive bonding system and a method of adhesively bonding at least two elements to one another by forming an adhesive bond therebetween with a high bond strength and subsequently easily separating the adhesively bonded elements under predetermined controlled conditions with little or no modifications required to the existing design, manufacturing, or repair specifications of either the elements undergoing bonding, to the equipment employed in the bonding process, or to the adhesive itself and wherein the bond strength and other properties of the cured adhesive prior to debonding are maintained under a variety of environmental conditions, including, but not limited to, elevated temperatures and high moisture conditions.

The present invention described herein also provides an adhesive bonding system and a method of adhesively bonding at least two elements to one another by forming an adhesive bond therebetween with a high bond strength and subsequently separating the adhesively bonded elements under predetermined controlled conditions, which bonding system and method are both affordable and practical to implement and involve a minimum of environmental disturbance of an audible, chemical or particulate nature.

The present invention also provides an adhesive bonding system and a method of adhesively bonding at least two elements to one another by forming an adhesive bond therebetween with a high bond strength and subsequently separating the adhesively bonded elements under predetermined controlled conditions, which method requires minimal technical skill or training to perform the procedures involved in assembly or disassembly of the component parts.

As used herein, the terms "bond," "bonding," or other variants thereof, have the usual meaning as the term is typically applied to adhesives, i.e., the setting or curing of a layer of adhesive between elements such that significant force is required to separate the elements. The term "debond," "debonding," or other variants thereof, as used herein, refer to an action or process which significantly or completely severs or weakens the bond formed between elements, such that the elements can be completely or substantially separated from one another with little force. The term "bondline," as used herein, refers to the adhesive layer between bonded elements, as well as the interfaces of the bonded elements directly in contact with the adhesive. For the present invention, the term "adherend" refers to an element that is adhesively bonded or adhered, exclusive of the shape memory alloy (hereinafter also referred to as "SMA") element. As used herein, the term "SMA-toadherend bondline," refers specifically to a bondline comprising a single adhesive layer between an SMA element and an adherend, as well as the associated SMA and adherend interfaces, while the term "overall bondline," as used herein, refers to all SMA-to-adherend bondlines, as well as the associated SMA and adherend interfaces, associated with a single SMA element and the adherends to which that SMA element is bonded. As used herein, "bondline failure" refers to the condition where significant or complete loss of strength occurs anywhere within the overall bondline. "Adhesive failure," as used herein, refers to a significant or complete loss in strength at the interface between an adhesive layer and the bonded adherend or SMA element. As used herein, "cohesive failure" refers to a significant or complete loss in strength within the adhesive layer, within the adherend, or within the SMA element. "Stiffness," as used herein, refers to the elastic modulus of a substance or material, independent of material geometry. "Rigidity," as used herein, refers to the general resistance of an element to any form of bending, straining, or deformation, and includes the effect of both material stiffness and geometry. The term "rigid" is used herein to describe an adherend having high rigidity, such that it is difficult to bend, strain, or deform the adherend.

The invention described herein is capable of providing the aforementioned characteristics and advantages to most structures where it may be optionally desirable to subsequently easily remove a component part from the structure without damage to either the component part or the remainder of the structure. However, this invention is most useful in structural applications, such as in an aeronautical environment, particularly in applications to aircraft of both fixed and rotary wing design, and most particularly to the latter.

The aforementioned advantages and characteristics of the invention are attributed to a bonding/debonding system including at least one shape memory alloy element sandwiched or disposed between and adhesively bonded to facing surfaces of two opposed, rigid components, or adherends, the strength, stiffness and thickness of each of the adherends and adhesive used in the adhesive bonding being such that actuation of the shape memory alloy element causes debonding of the adhesive. Typically the facing surfaces of the opposing, rigid elements are substantially parallel to each other. Although depending somewhat on the shape of the SMA elements employed, typically each surface of an SMA element that is adhesively bonded to a surface of an opposing, rigid element is arranged in facing relationship and substantially parallel to the surface of the opposing, rigid element to which it is bonded.

The present invention is also directed to a method of adhesively bonding and selectively debonding a plurality of elements or components that includes mechanically stressing a shape memory alloy element to a mechanically strained or deformed state; sandwiching or disposing the strained shape memory alloy element between and adhesively bonding the strained shape memory alloy element to facing surfaces of two opposing, rigid elements; subsequently elevating the temperature of the deformed shape memory alloy element sufficiently to transform it from the mechanically strained state to a mechanically unstrained or non-deformed state, thereby weakening the adhesive bond formed between a surface of the shape memory alloy element and a facing surface of at least one of the two opposing, rigid elements such that the bond is severed; and separating the facing surfaces of two opposing elements.

While some of the embodiments of the present invention are described herein in terms relating to vehicular or aeronautical environments, it is to be understood that this invention is not limited solely to such applications, but is applicable to all situations in which a first rigid element is adhesively bonded to a second rigid element with the intention of subsequent separation of the elements without damage thereto.

DESCRIPTION OF THE PREFFERED EMBODIMENTS

Figure 1:
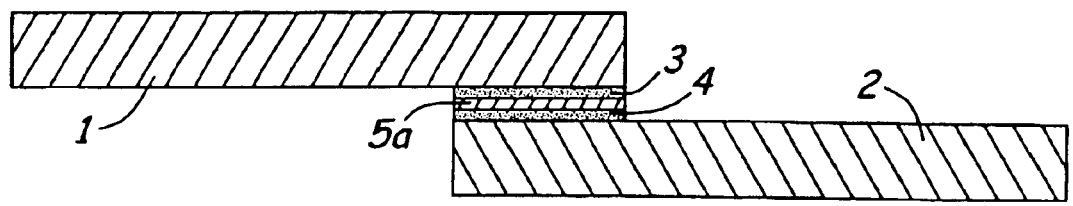
FIG. 1 is a schematic view of a shape memory alloy element-actuated debondable adhesive geometry of the adhesive bonding system of the invention prior to debonding.

The present invention makes use of the actuation properties of shape memory alloys, i.e., a shape memory alloy element employed in the invention changes in dimension or shape from that which it had at the time the shape memory alloy element was bonded to a rigid adherend. The mechanical work produced in this process results in the failure of at least one adhesive bondline formed between each of two rigid adherends and a shape memory alloy element disposed therebetween.

As noted above, in addition to the at least one shape memory alloy element and adhesive bondline, the adhesive bonding system of the invention includes at least two adherends that are adhered or joined indirectly to one another with the at least one shape memory alloy element and adhesive bondlines placed therebetween. The adhesive bonding system includes both situations in which the adherends are of the same or similar sizes, as well as those in which one adherend is substantially larger than others, such as one large structure to which one or more smaller adherends are affixed.

Shape memory alloys of the type preferred in the present invention are metallic alloys that are capable of producing large strains when heated through a characteristic temperature range as the result of a solid-state transformation. Generally, the most significant feature of shape memory alloys that render them useful in the present invention is their ability to be deformed at a relatively low temperature and upon exposure to a higher temperature return substantially to their shape prior to the deformation.

More particularly, at a low temperature, such as ambient or room temperature, or in some cases sub-ambient temperatures, the SMA is strained or deformed into some new size or shape. The shape prior to deformation is referred to herein as the "set shape," and the shape after deformation is referred to as the "deformed shape." If the deformed SMA element is heated at a continuous rate, no transformation will occur prior to reaching some specific temperature, hereinafter referred to as the "lower transformation temperature." Above this temperature, the deformed SMA will begin to revert towards the set shape, with the maximum shape recovery (also known as "actuation") complete at some specific higher temperature, referred to hereinafter as the "upper transformation temperature." The values of and range between the upper and lower transformation temperatures are dependent on, and specific to, the composition of the particular SMA. The shape after maximum shape recovery is referred to herein as the "recovered shape" and is usually very similar to, although not exactly the same as, the original set shape.

In the present invention, the deformed shape can include substantially any sort of impermanent deformation from the original configuration of the shape memory alloy element. The type of deformation depends, at least in part, on the contours of the surfaces of the rigid adherends being adhesively joined to the surfaces of the shape memory alloy element that is sandwiched therebetween. While in some situations such deformations may include compression, bending, or twisting, more typically the shape memory alloy elements are deformed by elongation.

Although a wide variety of alloys are known which exhibit the shape memory effect (including Au—Cd, Cu—Al—Ni, Cu—Sn, Cu—Zn, Cu—Zn—X (where X=Si, Sn, Al), In—Ti, Ni—Al, Ni—Ti, Fe—Pt, Fe—Pt, Fe—Pd, Fe—Ni—C, Fe—Mn—Si, Fe—Mn—Si—Cr—Ni, Mn—Cu and Fe—Mn—Si), only those that can recover substantial amounts of strain and/or that generate significant force upon changing shape are of significant interest in the present invention. For example, some SMAs are capable of recovering up to about 8% strain, and can generate up to about 500 MPa of stress. Shape memory alloy elements suitable for this invention should also have transformation temperatures which lie above all temperature conditions to which the adhesive bondline is expected to be exposed prior to debonding, referred to herein as the "service temperature range". For example, many aircraft applications require an upper service temperature of about 180° F. (82° C.), and accordingly, a SMA actuator should be selected having a lower transformation temperature that lies above this temperature. In practice the lower transformation temperature should exceed the maximum service temperature by at least about 5° F. (3° C.).

Currently, preferred shape memory alloys include the nickel-titanium alloys and copper-based alloys, such as Cu—Zn—Al and Cu—Al—Ni. Properties of the two systems differ significantly. The Ni—Ti alloys, known collectively as "Nitinol", permit greater shape memory strain (up to about 8%, compared to 4 to 5% for the copper-based alloys), tend to be more thermally stable and have much higher ductility than the Cu-based alloys. Additionally, while Nitinol alloys have excellent corrosion resistance, the Cu-based alloys have only moderate corrosion resistance, and are susceptible to stress-corrosion cracking. Another important advantage of the Nitinol alloys is that they are currently widely available commercially from a large number of vendors. Through composition selection, a wide spectrum of Nitinol transformation temperature ranges, extending from about −325° F. to about 230° F. (−200° C. to 110° C.), can be employed in the invention.

Figure 2:
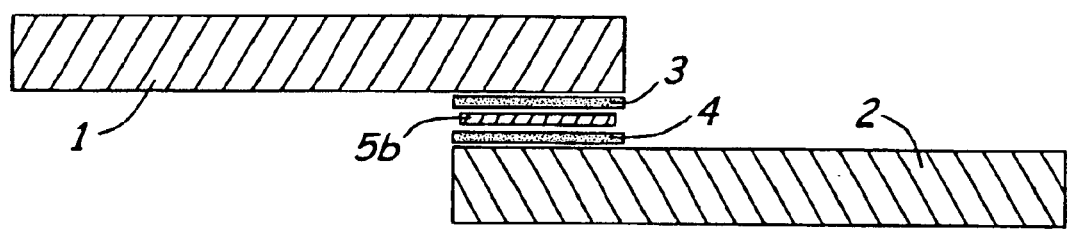
FIG. 2 is a schematic view of the shape memory alloy element-actuated debondable adhesive geometry of the adhesive bonding system of FIG. 1 after debonding.
Figure 3:
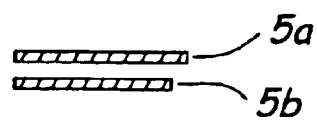
FIG. 3 is a schematic view comparing the shape memory alloy elements of FIGS. 1 and 2 (before and after debonding).

The thermally-driven shape recovery of SMA elements is used in the method of the present invention to selectively debond adhesive bondlines. The simplest embodiment of the invention is illustrated schematically in FIGS. 1 to 3. Before bonding, the SMA element or actuator is deformed at or close to room temperature, typically to about 8% when Nitinol is used, to form a strained or deformed shape memory alloy element 5a. Adhesive bondlines 3 and 4 are then placed on each surface of the SMA element 5a intended to face rigid adherends 1 and 2. The deformed shape memory alloy element 5a is thereafter sandwiched between and bonded to adherends 1 and 2 in facing relationship thereto, as illustrated in FIG. 1. In the preferred embodiment, the areas of the adhesive bondlines 3 and 4 are maintained to be smaller than the areas of the surfaces of the SMA element 5a in which they are in contact in order to avoid direct adhesive bonding between the rigid adherends 1 and 2, i.e., each adherend is bonded to a separate surface of the SMA element rather than directly to each other. This condition assures that the rigid adherends are totally separable upon actuation (exposure to the transformation temperature range) of the shape memory alloy element 5a.

As noted above, the shape of the SMA is not limited to any particular configuration, but is determined by various factors such as preferred bond area and the shapes of the adherends which are to be bonded. Preferably, the surfaces of the SMA element will be commensurate in shape to the respective surfaces of the adherends to which it is bonded. Since bondlines in conventionally bonded adherends are designed to be relatively thin (typically about 0.005 to about 0.050 inches) in order to minimize the gap between bonded adherends and optimize load transfer, it is preferable to use an SMA element which is comparable in thickness to or thinner than the adhesive bondline thickness (as used herein, "bondline thickness" refers to the distance between the surface of the SMA and the surface of the adjacent adherend to which it is bonded). Accordingly, in aeronautical applications it is preferable for the SMA actuator to be less than about 0.050 inches in thickness. In other applications, suitable SMA thicknesses may be greater than about 0.050 inches.

The static mechanical properties of a conventional adherend-to-adherend bonded structure are determined by the adhesive strength of the adherend-to-adherend bond, the cohesive strength and stiffness of the adhesive, the strength and stiffness of the adherends, and the geometry of the bondline and adherends. In the debondable system of this invention, the static mechanical properties of the bonded structure are determined by the adhesive strength of the adherend-to-SMA bonds; the cohesive strength and stiffness of the adhesive; the strength and stiffness of the adherends; the strength and stiffness of the SMA element; and the geometry of the bondline, adherends, and SMA element. The strength and stiffness of most shape memory alloys, particularly those that are suitable for use in the present invention, are comparable to or exceed those of adhesives and adherends used in most conventional adherend-to-adherend bonded structures. Therefore, by selecting adhesives which bond well to the SMA element, and using thin SMA elements which only slightly increase the overall bondline thickness, in most cases the static mechanical properties of the debondable system are substantially equivalent to those of conventionally bonded structures.

Debonding of the adherends occurs when transformation of the SMA element to its recovered shape (indicated by reference numeral 5b in FIGS. 2 and 3) causes a failure of the adhesive bondlines 3 and 4. As transformation progresses, i.e., as the temperature is raised from a temperature immediately above the lower transformation temperature through the upper transformation temperature, the bonded SMA element is constrained from reverting to its recovered shape by the adhesive layer. A constrained SMA which is not allowed to freely revert to its recovered shape during transformation will develop internal stresses (referred to herein as "recovery stresses"), with the magnitude of these recovery stresses increasing as the extent of SMA transformation increases. These stresses are transmitted to the constraining material, in this case the adhesive, and cause failure in the adhesive.

Since more rigid constraint causes the development of higher recovery stresses, stiffer adhesives are more likely to develop high stresses and fail than are rubbery adhesives. For this reason, stiffer adhesives are preferred over rubbery adhesives in the present invention. An additional consideration is the failure strength of the adhesive, since weaker adhesives will fail at lower loads than stronger adhesives. The magnitude of the recovery stresses transmitted to the adhesive is also related to the thickness of the SMA element, thicker shape memory alloy elements being capable of generating larger forces in the adhesive. However, any increases to SMA element thickness in order to increase recovery stresses are reconciled in conjunction with bondline thickness considerations, as discussed above, which may limit acceptable SMA element thicknesses in some applications.

In a preferred embodiment of the invention, the SMA element thickness is comparable to conventional adhesive bondline thicknesses, typically about 0.005 to about 0.050 inches. With this thickness of SMA element, adhesives can be failed with lap shear failure strengths up to about of 5,700 psi, which includes most conventional adhesives, as well as many of the currently available high performance engineering adhesives having lap shear failure strengths as high as about 10,000 psi. Much higher strength adhesives can be failed by using thicker SMA elements.

In another preferred embodiment, the strength of the adherend is higher than the strength of the adhesive, so that failure occurs in the adhesive bondline and not in the adherend. When using very high strength adhesives, such as some high performance engineering adhesives, it is possible that failure can be transmitted to the adherend, rather than the adhesive, if the adherend has a relatively low strength. This situation can occur in the case of rigid adherends formed from laminated composite materials, which have a particularly low interlaminar strength. Therefore, when using such rigid composite adherends, adhesives with lap shear strengths below about 5000 psi, preferably below about 4000 psi, may be used. For metal adherends, such as aluminum, steel, and titanium structures, most conventional engineering adhesives can be failed without risking adherend damage.

For the preferred SMA element thickness of about 0.005 to about 0.050 inches, and comparable adhesive bondline thicknesses, the preferred adhesive stiffness (modulus) is greater than about 1000 psi. Adhesives which meet this stiffness condition, as well as the aforementioned strength condition, include most commercially available, conventional adhesive systems. Preferred examples of such adhesives and adhesive systems include epoxies, acrylates, methacrylates, cyanoacrylates, phenolics, bismaleimides, and polyimides. Less stiff adhesives, such as most urethanes, polythioethers, and silicone rubbers, are often too rubbery to fail completely during SMA recovery. However, in some cases failure of these rubbery adhesives is possible by using very thin bondlines (less than about 0.005 inches), which increases the shear strain in the adhesives and can cause failure during actuation of shape memory alloy elements.

The rigidity of the adherend must also be sufficient to ensure that the SMA is prevented from straining during actuation, so that large recovery stresses are generated and cause bondline failure. Most metal and composite adherends whose thickness is much greater than the SMA element thickness will be sufficiently rigid to cause bondline failure during SMA actuation. For the preferred embodiment of the invention, the preferred SMA element has a thickness of about 0.005 to about 0.050 inches, and the preferred minimum adherend thickness is about 10 times the thickness of the shape memory alloy element, typically this minimum thickness ranges from about 0.050 inches to about 0.500 inches, respectively. Adherents composed of extremely low stiffness materials, such as urethanes and silicone rubbers, although generally less desirable for most applications of the present invention, when used to achieve a particular purpose, may require greater adherend thicknesses.

To debond the assembly, heat is applied to the bondline. The SMA element should be heated through its upper transformation temperature in order to ensure full transformation and generation of maximum SMA recovery stresses and, therefore, maximum stresses in the adhesive. Since no transformation occurs below the lower transformation temperature, the adhesive bond performance is fully maintained up to that temperature. In order to assure full strength of the adhesive during service, a shape memory alloy is selected having a lower transformation temperature that is higher than the upper limit of the service temperature range. Using commercially available Nitinol SMAs, the lower transformation temperatures are typically as high as about 200° F. (about 93° C.), so that service temperatures up to about 195° F. (about 91° C.) are possible.

Once the SMA element has been actuated, it does not fully recover its original strain upon cooling to room temperature. Although somewhat variable, typically the recovered shape is within about 1% of the set shape. Therefore, the SMA element cannot be reused as a debonding actuator unless it is re-deformed mechanically at low temperature prior to rebonding. In most cases, substituting a new pre-deformed SMA element is preferable to re-deforming the used actuator.

When debonding occurs as it does in the present invention, i.e., through failure of the adhesive, no damage occurs to the adherends during the debonding process. Once the residual adhesive layers on the adherends have been removed, through any suitable method, preferably either grit blasting or sanding, the adherends can be rebonded.

The method of heating the bondline depends on the particular materials from which the components are formed, the arrangement and geometry of the components and the conditions to which the structure is subjected. In the simplest cases, heat can be applied using conventional methods such as heat blankets, heat guns, radiant heaters, and convection ovens. Since the SMA bondline is substantially embedded in the overall structure, in most instances these surface heating methods are applicable when at least one adherend is thin or highly thermally conductive. In cases where these conventional heating methods are not capable of heating the embedded SMA element, electromagnetic heating (e.g. induction heating or microwave heating) may also be used to heat the adherend, shape memory alloy element, or both the adherend and shape memory alloy element. The SMA element may also be heated by directly passing an electrical current through the SMA element. However, while effective, this approach requires designing the bond geometry such that direct electrical contact can be made with the SMA element, either through embedded electrical leads or through exposed SMA surfaces on which electrodes can be placed prior to debonding.

Prior to bonding the SMA element in the adhesive bondline, it is preferred to subject the SMA element to one or more preliminary treatments. First, the SMA is preferably heat treated at temperatures well above the lower and upper transformation temperatures in order to "erase" (eliminate) any previous shape memory in the material and impose the set shape. The conditions of heat treatment are well-known to those skilled in the art. The SMA element is first constrained in a jig to its set shape. For the preferred embodiment, the set shape is simply a flat strip, so for an as-received SMA strip no jig is required. For Nitinol, the SMA is then heated in a convection oven to a temperature within the range of about 950° F. to about 1100° F. (510° C. to 593° C.), followed by rapid quenching in water initially at room temperature (quench rates typically about 200° F./s or about 93° C./s).

It is also preferred to subject the SMA element to a surface treatment prior to bonding in order to increase adhesion between the adhesive and the SMA element. Such a treatment is not unique to shape memory alloy elements and is frequently performed on many metal surfaces prior to the application of a coating or an adhesive to a metal surface. In the present invention, the SMA surface may be prepared for adhesive bonding according to practices known to those in the metal surface treatment arts. Typically this involves first roughening the surface, using rough sandpaper, grit blasting, or a chemical etch. This roughening step may then be followed by a second surface treatment or surface coating, such as the application of a painted-on or dip-coated primer. In the preferred embodiment, a 1% solution of 3-glycidoxyproplytrimethoxysilane (Dow Coming Z-60400) in water (pH adjusted to 4–5 using glacial acetic acid) is prepared. The SMA element is dipped in the silane solution for 1–3 minutes and then removed from the solution and heated to 93° C. for 1–1.25 hours.

When the shape memory alloy element is subjected to both a heat treatment and a surface treatment, it is preferable to perform the heat treatment before the surface treatment. Many surface treatments, such as the silane treatment, would be destroyed by the high heat treatment temperatures.

Prior to bonding and, when employed, after heat treatment and/or surface treatment, the set shape is strained to the deformed state. In the preferred embodiment of the invention, a flat shape memory alloy element is stretched to an elongated state by clamping its ends in a mechanical jig and increasing the distance between the clamps by application of an external force. Typically, for Nitinol shape memory alloys, the shape memory alloy element is strained about 10% under load, which, after release of the load, relaxes to a strain of about 8%.

EXAMPLE

Strips of Nitinol alloy from Special Metals, Inc. (New Hartford, N.Y.) were selected having a nominal lower transformation temperature of approximately 158° F. (70° C.) and an upper transformation temperature of approximately 203° F. (95° C.) and having dimensions of 0.275 inch wide×12 inches long×0.010 inch thick. Each of the Nitinol SMA strips was heat treated in a convection oven at 1022° F. (550° C.) for 15 minutes and then quenched in a water bath initially at room temperature. The strips were then subsequently grit blasted and subjected to coating with a silane surface treatment using a 1% solution of 3-glycidoxyproplytrimethoxysilane (Dow Coming Z-60400) in water (pH adjusted to 4–5 using glacial acetic acid). The SMA strips were dipped into this solution for 1–3 minutes and then removed from the solution and heated to 200° F. (93° C.) for 1–1.25 hours. After silane treatment, the strips were clamped into a Synergie servomechanical material testing device manufactured by MTS Systems Corp. (Eden Prarie, Minn.), and pulled axially to 10% strain. Upon removal of the axial extension force, the strips relaxed to a strain of 8% relative to their original length and were cut into shorter strips having a length of about 1.25 inches.

Adherends having dimensions of 1 inch wide×6 inches long×0.125 inch thick were fabricated from unidirectional 8551 epoxy/carbon fiber composite prepreg materials available from Hexcel Corp. (Dublin, Calif. A unidirectional layup was chosen both to maximize longitudinal strength, and to minimize induction heating in the adherend. The adherends were grit blasted and solvent-wiped before bonding. Loctite Hysol (Bay Point, Calif.) EA9394, a two-part paste epoxy adhesive, was used to adhesively join the composite adherends and the Nitinol SMA strips. Adhesive was spread on both faces of the SMA strips and the faces of the adherends prior to bonding. The components were then assembled in a lap shear geometry to form two samples, substantially as shown schematically in FIG. 1, where the overlap length is 0.5 inches. Because the Nitinol strips were only 0.275 inches wide, they were placed in a side-by-side arrangement in order to cover the fill 0.5 inch dimension of the overlap area. The 1.25 inch length of each of the SMA strips also allowed them to fully cover the 1 inch dimension of the overlap area. Once assembled, the lap shear samples were taped together under hand pressure, and allowed to cure at room temperature for 3 days. Each individual adhesive bondline was approximately 0.010 inches thick, so that the overall thickness of the adhesive-SMA-adhesive bondline was approximately 0.030 inches. After curing, excess adhesive outside of the intended bonding area was removed from the samples mechanically.

To determine the normal service performance of the cured, bonded samples, one sample was tested mechanically at room temperature. The sample was pulled to failure according to standard lap shear testing procedures in an Instron (Canton, Mass.) model 4500 servomechanical material testing device at a loading rate of 0.51 mm/min. The specimen failed at a lap shear stress of 5700 psi, which is comparable to the rated minimum mechanical strength of the EA9394 adhesive system (4200 psi).

To demonstrate debonding of the adhesive, the second bonded sample was placed in a 10.5 MHz induction field, generated by a NovaStar 1M induction generator, available from Ameritherm Inc. (Scottsville, N.Y.), for 30 seconds. The induction field amplitude was estimated to be approximately 10–100 Oe. Under these induction conditions, it was determined that the SMA strips in the sample were heated to approximately 250° F. (121° C.), which exceeds the upper and lower transformation temperatures for this alloy. After induction heating, the lap shear sample was examined and found to have been completely debonded. Failure had occurred within all the SMA-to-adherend bondlines, with no damage or failure in the composite adherends themselves.

It is obvious that many modifications and variations of the present invention are possible in light of the above teachings. It is, therefore, to be understood that within the scope of the appended claims, the invention may be practiced otherwise than as described.

What I claim is:

1. A separable bonding system comprising:
    two rigid adherends arranged in opposed, spaced relationship to each other; and
    a deformed shape memory alloy element disposed between and adhesively bonded to facing surfaces of the two rigid adherends.

2. The bonding system according to claim 1 wherein the facing surfaces of the two rigid adherends are substantially parallel to each other.

3. The bonding system according to claim 1 wherein each surface of the shape memory alloy element adhesively bonded to a facing surface of a rigid adherend is arranged in facing relationship and substantially parallel to the surface of the rigid adherend to which it is bonded.

4. The bonding system according to claim 1 wherein said shape memory alloy element and said rigid adherends are bonded to one another with an adhesive having a stiffness of at least about 1000 psi.

5. The bonding system according to claim 1 wherein said shape memory alloy element and said rigid adherends are bonded to one another with an adhesive having a lap shear failure strengths of up to about 10,000 psi.

6. The bonding system according to claim 1 wherein said shape memory alloy element and said rigid adherends are bonded to one another with an adhesive having a lap shear failure strength of up to about 5700 psi.

7. The bonding system according to claim 1 wherein said rigid adherends are formed from composite materials and said shape memory alloy element and said rigid adherends are bonded to one another with an adhesive having a lap shear failure strength of up to about 5000 psi.

8. The bonding system according to claim 1 wherein said rigid adherends are formed from composite materials and said shape memory alloy element and said rigid adherends are bonded to one another with an adhesive having a lap shear failure strength of up to about 4000 psi.

9. The bonding system according to claim 1 wherein said shape memory alloy element is formed from a shape memory alloy having a lower transformation temperature of up to about 200° F.

10. The bonding system according to claim 1 wherein said shape memory alloy element and said rigid adherends are bonded to one another with adhesive bondlines and the thickness of the shape memory alloy element is equal to or less than the thickness of each of the bondlines.

11. The bonding system according to claim 10 wherein the thickness of each of the bondlines is about 0.005 to about 0.050 inches.

12. The bonding system according to claim 1 wherein the shape memory alloy element is formed from Nitinol.

13. The bonding system according to claim 1 wherein the shape memory alloy element is adhesively bonded to facing surfaces of the two rigid adherends using an adhesive selected from the group consisting of epoxies, acrylates, methacrylates, cyanoacrylates, phenolics, bis-maleimides, and polyimides.

14. The bonding system according to claim 1 wherein the two rigid adherends are vehicular components.

15. A method of adhesively bonding and selectively debonding and separating at least two rigid adherends comprising:

mechanically straining a shape memory alloy element so as to form a deformed shape memory alloy element;

disposing the deformed shape memory alloy element between and adhesively bonding the deformed shape memory alloy element to facing surfaces of at least two rigid adherends;

elevating the temperature of the deformed shape memory alloy element sufficient to transform the deformed shape memory alloy element from the mechanically strained state to a recovered shape, thereby weakening adhesive bonds formed between the shape memory alloy element and facing surfaces of the at least two rigid adherends; and separating the facing surfaces of the at least two rigid adherends.

16. The method of adhesively bonding and selectively debonding and separating at least two rigid adherends according to claim 15, further comprising subjecting the shape memory alloy element to a heat treatment prior to mechanically straining it.

17. The method of adhesively bonding and selectively debonding and separating at least two rigid adherends according to claim 15, further comprising subjecting surfaces of the shape memory alloy element to an adhesion increasing surface treatment prior to mechanically straining it.

18. The method of adhesively bonding and selectively debonding and separating at least two rigid adherends according to claim 15 wherein the deformed shape memory alloy element has a service temperature range and the deformed shape memory alloy element is subjected to heating to elevate the temperature thereof to within a transformation temperature range, the lower limit of which is at least about 5° F. above the service temperature range.

19. The method of adhesively bonding and selectively debonding and separating at least two rigid adherends according to claim 15, further comprising, prior to mechanically straining the shape memory alloy element, subjecting it to a heat treatment and thereafter subjecting surfaces of the shape memory alloy element to an adhesion increasing surface treatment.

20. The method of adhesively bonding and selectively debonding and separating at least two rigid adherends according to claim 15 wherein the at least two opposing rigid adherends are vehicular components.

* * * * *